United States Patent [19]
Valizadeh et al.

[11] Patent Number: 5,678,006
[45] Date of Patent: Oct. 14, 1997

[54] NETWORK SWITCH HAVING NETWORK MANAGEMENT AGENT FUNCTIONS DISTRIBUTED AMONG MULTIPLE TRUNK AND SERVICE MODULES

[75] Inventors: Homayoun S. Valizadeh, San Ramon; Madhu R. Grandhi, Fremont, both of Calif.

[73] Assignee: Cisco Systems, Inc., San Jose, Calif.

[21] Appl. No.: 595,494

[22] Filed: Feb. 1, 1996

Related U.S. Application Data

[63] Continuation of Ser. No. 429,593, Apr. 27, 1995, abandoned.
[51] Int. Cl.$^6$ .................................................. G06F 13/00
[52] U.S. Cl. ............................ 395/200.02; 395/200.09
[58] Field of Search .......................... 395/200.06, 800, 395/200.02, 200.09

[56] References Cited

U.S. PATENT DOCUMENTS

| | | | |
|---|---|---|---|
| 5,191,651 | 3/1993 | Halim | 395/200 |
| 5,452,433 | 9/1995 | Nihart | 395/500 |
| 5,485,455 | 1/1996 | Dobbins | 370/60 |
| 5,522,044 | 5/1996 | Pascucci | 395/200.06 |
| 5,550,816 | 8/1996 | Hardwick | 370/60 |
| 5,564,070 | 10/1996 | Want | 455/53.1 |

OTHER PUBLICATIONS

*Internet Network Management Using the Simple Network Management Protocol*, by Case, J. et al, Local Computer Networks, 1989, 14th Conf. pp. 156–159.

PCT Notification of Transmittal of The International Search Report Or The Declaration (PCT Rule 44.1) Form PCT/ISA/220 (Nov. 27, 1996) PCT/US96/05836.

Yechiam Yemini, "The OSI Network Management Model," *IEEE Communications Magazine*, vol. 31, No. 5, pp. 20–29 (May 1993).

Mary Jander, "Midlevel Managers Ease SNMP Information Overload," *Data Communications* vol. 22, No. 5, pp. 53 54, 56, 58 (Nov. 21, 1993).

Kwang–Hui Lee, "A Distributed Network Management System," *Proceedings of the Global Telecommunications Conference* (GLOBECOM), San Francisco, IEEE ref. 078031820–x/94, vol. 1, pp. 548–550 (Nov. 28,1994).

Mary Jander, "Coming Soon to a Network Near You," *Data Communications* vol. 21, No. 16, pp. 66–70 (Nov. 1, 1992).

One page English language abstract of Japanese patent document number JP6224915 dated Dec. 8, 1994.

*Primary Examiner*—Eric Coleman
*Attorney, Agent, or Firm*—Blakely, Sokoloff, Taylor & Zafman, LLP

[57] ABSTRACT

A network that implements a network management protocol. The network comprises a network manager coupled to a plurality of network nodes. Each network node has a network address to which the network manager addresses network management messages for controlling the configuration of the network nodes. The plurality of network nodes include a first network node. The first network node includes a plurality of management agents and a message forwarding circuit coupled to the management agents, wherein the network manager transmits a management message to the network address of the first network node and the message forwarding circuit forwards the management message to a first management agent specified by the management message.

13 Claims, 4 Drawing Sheets

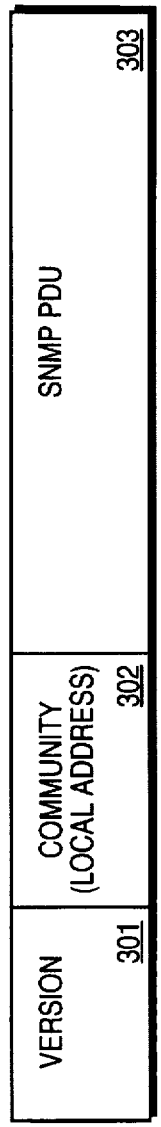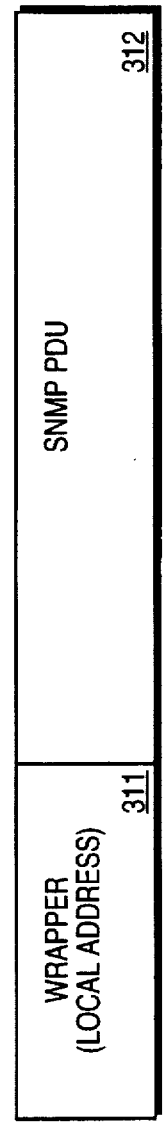
FIG. 3A
FIG. 3B

NETWORK SWITCH HAVING NETWORK MANAGEMENT AGENT FUNCTIONS DISTRIBUTED AMONG MULTIPLE TRUNK AND SERVICE MODULES

The present application is a continuation of Application Ser. No. 429,593, filed Apr. 27, 1995, now abandoned.

FIELD OF THE INVENTION

The present invention relates generally to the management of network nodes and more particularly to a mechanism for simplifying the development and maintenance of a network node.

BACKGROUND OF THE INVENTION

Network switches such as the IPX® and the BPX™ sold by Stratacom, Inc. of San Jose, Calif., are used to provide a data path between multiple networks, each of which may operate according to a different networking standard protocol such as frame relay or Asynchronous Transfer Mode (ATM). FIG. 1 shows a prior art network switch 100 that is a node of a network.

Network switch 100 generally comprises a data path 125 and command bus 127 to which a controller 105, a trunk module 110, and service modules 115 and 120 may be coupled. Trunk module 110 is coupled to trunk A that connects network switch 100 to other nodes of the network. Service modules 115 and 120 are coupled to customer premise equipment (CPE) B and CPE C, respectively. The trunk and service modules may be configured in a number of different ways to allow communication between trunk A, CPE B, and CPE C via data path 125.

Controller 105 generally performs control functions for network switch 100 using command bus 127. Controller 105 also provides an interface that allows network manager 130 to control the configuration of network switch 100. Network manager 130, in turn, provides a user interface 135 that allows a human user access to and control of network switch 100.

Network manager 130 and all nodes of the network implement a network management protocol known as the simple network management protocol (SNMP) that allows network manager 130 to control configuration of network switch 100 and other network nodes (not shown). Accordingly, network manager 130 includes an SNMP manager application 131 for performing SNMP manager functions. Network manager 130 also includes a local management information base (MIB) 132 that stores information regarding the configuration and behavior of all the network nodes under the network manager's control, including network switch 100. MIB 132 also stores summary information about SNMP agents under the SNMP manager's control. A human user is provided access to the information stored by MIB 132 via user interface 135. Network manager 130 may be implemented as a network server.

The only network link provided between network manager 131 and network switch 100 is coupled to controller 105 which includes an SNMP agent application 106 for performing SNMP agent functions. Controller 105 includes a local MIB 107 that contains information regarding each of the trunk and service modules, including the configuration and capabilities of each trunk and service module. MIB 132 of network manager 130 includes a copy of MIB 107 and the MIBs of all other network nodes.

Network manager 130 treats network switch 100 as a single network node, addressing all communications destined for network switch 100 to the network address of network switch 100. Controller 105 receives and processes the SNMP message, using MIB 107 to determine which local resources are affected by the SNMP message. If the SNMP message affects a resource of network switch 100 that is not present on controller 105, controller 105 translates the configuration information originally contained in the SNMP message to a format suitable for use by the target trunk or service module. Controller 105 then transfers the translated configuration information to the target trunk or service module using command bus 127. The target trunk or service module receives and processes the configuration information, and the target trunk or service module indicates completion of configuration operations to controller 105 using command bus 127. Controller 105 transmits an appropriate reply SNMP message to network manager 130 to complete the management transaction.

A major disadvantage of this prior art arrangement is that whenever the function of a trunk or service module is modified or a new trunk or service module is added to network switch 100, the system software of the controller 105 (which includes MIB 107 and SNMP agent application 106) must be modified and tested. This greatly complicates the task of enhancing and maintaining network switch 100.

SUMMARY AND OBJECTS OF THE INVENTION

It is a therefore an object of the present invention to simplify the development and maintenance of a network node by reducing the need to modify the controller of a network node when a trunk or service module is modified or added to the network node.

It is a further object of the present invention to distribute network management functions among the trunk and service modules of a network switch to reduce the amount of processing overhead required of the controller of the network switch.

These and other objects of the invention are provided by a network that implements a network management protocol such as SNMP. The network comprises a network manager coupled to a plurality of network nodes. Each network node has a network address to which the network manager addresses network management messages for controlling the configuration of the network nodes. The plurality of network nodes include a first network node. The first network node includes a plurality of management agents and a message forwarding circuit coupled to the management agents, wherein the network manager transmits a management message to the network address of the first network node and the message forwarding circuit forwards the management message to a first management agent specified by the management message. Wherein SNMP is used, local address information is included in a community field of the SNMP message, and the message forwarding circuit checks the community field to determine the local address of the destination management agent.

Other objects, features, and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings, in which like references indicate similar elements, and in which:

FIG. 3A shows a management message according to one embodiment.

FIG. 3B shows a management message according to another embodiment.

DETAILED DESCRIPTION

Figure 1:
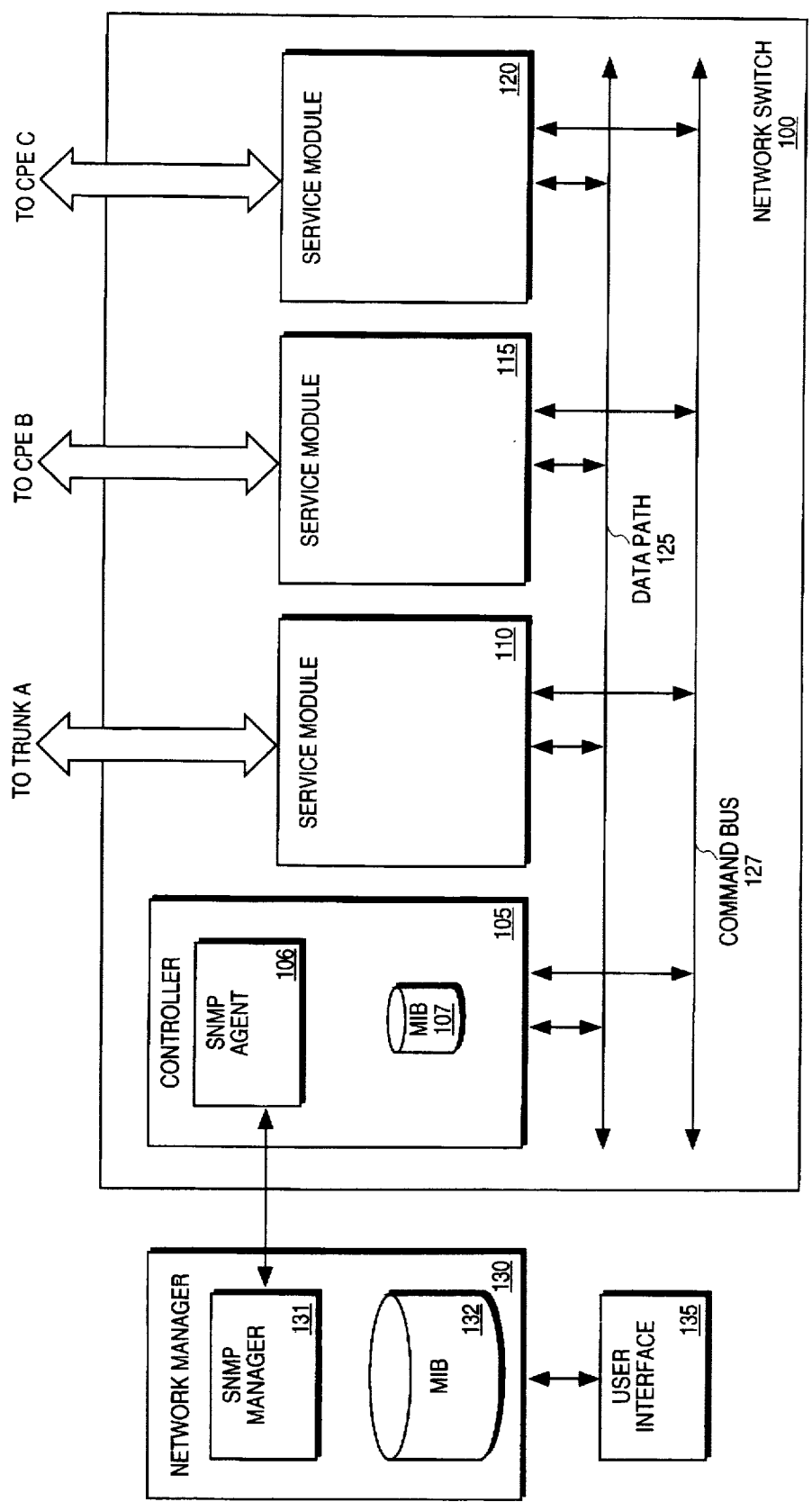
FIG. 1 shows a network management system of the prior art.
Figure 2:
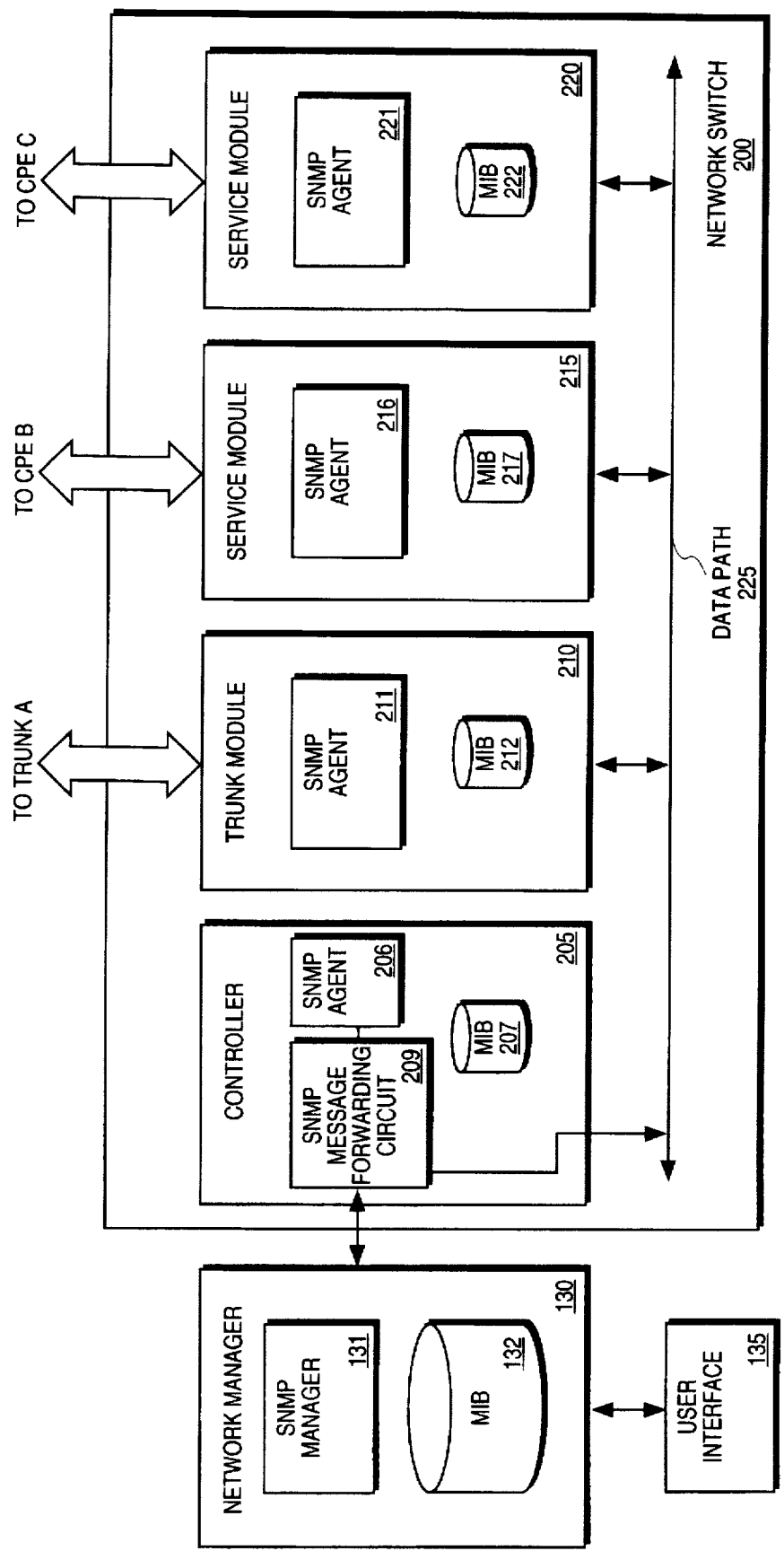
FIG. 2 Shows a network management system according to one embodiment.

FIG. 2 shows a network management system according to a present embodiment wherein the management agent functions normally required of the controller of a network switch are distributed among the service modules of the network switch. The embodiment of the present invention described herein is discussed with specific references to SNMP in order to facilitate understanding, but the mechanisms and methodology described herein work equally well with other network management protocols such as simple network management protocol version 2 (SNMPv2).

In the prior art arrangement described above, the controller of the network switch may be viewed as acting as an SNMP proxy agent on behalf of the trunk and service modules of the network switch. The principles of the present embodiment may be readily adapted to reduce the network management overhead of any network node that acts as a proxy agent for network resources not directly accessible by the network manager.

FIG. 2 shows a network switch 200 that includes controller 205, trunk module 210, and service modules 215 and 220, wherein each of the controller 205, the trunk module 210, and service modules 215 and 220 include a management agent and an MIB for performing network management functions. Specifically, controller 205 includes management agent 209 and MIB 207; trunk module 210 includes management agent 211 and MIB 212; service module 215 includes management agent 216 and MIB 217; and service module 220 includes management agent 221 and MIB 222. In keeping with the continuing example of SNMP network management systems, each of the management agents 206, 211, 216, and 221 are depicted in FIG. 2 as "SNMP agents."

Network switch 200 is a network node having a corresponding network address, and all communications directed from network manager 130 to network switch 200 are received by controller 205. In contrast to the previously described prior network management systems, however, controller 205 includes a management message forwarding circuit 209 (which is depicted in FIG. 2 as an "SNMP message forwarding circuit") that receives management messages and determines the local destinations of management messages without processing the management message. Instead, a field of the management message is adapted to include information from which may be derived the corresponding "local" address of the target destination of the management message. The local address is distinct from the network address of network switch 200.

Message forwarding circuit 209 determines the local address from the adapted field and forwards the management message to the correct management agent. If the management message is destined for management agent 206 of controller 205, message forwarding circuit 209 forwards the management message to controller 205 via an internal path (not shown). If the management message is destined for the management agent of a trunk or service module, message forwarding circuit 209 forwards the management message to the appropriate trunk or service module via data path 225 as determined by the local address.

Because the trunk and service modules are provided with facilities for handling management messages, management messages may be forwarded directly to the trunk and service modules via data path 225 without requiring protocol translation or processing of the management message by controller 205. Thus, controller 205 need not become unnecessarily involved with the processing of management messages directed to network switch 200.

Message forwarding circuit 209 further allows trunk and service modules to be added to or removed from network switch 200 without requiring the modification and testing of the system software of controller 205 or of other unmodified trunk or service modules. Instead, only the system software of the trunk or service module that is reconfigured or added need be modified and tested. Therefore, the maintenance of network switch 200 is simplified.

Message forwarding circuit 209 may be implemented as hardware or as software that may be executed by a local processor (not shown) of controller 205. According to the present embodiment, message forwarding circuit 209 is generally comprised of logic circuitry that determines the local address from the appropriate field of the management message and executes the appropriate data path transfer operations in response to the detected local addresses management messages. Message forwarding circuit 209 may also include buffer memory for buffering management messages received from network manager.

The operation of the network that includes network manager 130 and network nodes such as network switch 200 is now described with respect to the SNMP. To configure the operation of network switch 200, network manager 130 transmits an SNMP message addressed to the network address of network switch 200. The SNMP message has been modified to include local address information so that message forwarding circuit 209 may forward to the SNMP message directly to the physical location where the affected resources reside. The SNMP message is processed by the SNMP agent that manages the affected resources using its local MIB.

FIG. 3A shows a modified SNMP message 300 according to the present embodiment as generally including a VERSION field 301, a COMMUNITY field 302, and an SNMP Protocol Data Unit (PDU) field 303, wherein COMMUNITY field 302 has been modified to include a local address of network switch 200. VERSION field 301 specifies the version of SNMP used by the network management system, and SNMP PDU field includes the actual management command to be performed.

According to the SNMP, the COMMUNITY field 302 contains an arbitrary string of information that identifies a "community" or relationship between an SNMP agent and a set of one or more SNMP managers. This relationship defines authentication, access-control, and proxy characteristics for the community. Each community is given a community name that is unique within the SNMP agent, and each SNMP manager within the community is provided with and employs the community name for all SNMP messages directed to that SNMP agent.

According to the present embodiment, COMMUNITY field 302 contains local address information in addition to normal authentication information. Because the information identifying a community may be arbitrarily defined, the string of information contained in the COMMUNITY field may be defined to include local address information. Network manager 130 is provided with local address information for each of the service modules and the controller so that network manager 130 may correctly enclose said local address information in the COMMUNITY field 302.

FIG. 3B shows an SNMP message 310 according to SNMPv2. SNMP message 310 comprises a WRAPPER field 311 and an SNMP PDU field 312. WRAPPER field 311 has been modified to include local address information. Wherein the network management protocol is SNMPv2, WRAPPER field 311 is processed by message forwarding circuit 209 in a similar manner that the COMMUNITY field 302 is processed.

Wherein data path 225 is implemented as a backplane bus and the controller, trunk and service modules are implemented as bus cards that are connected to data path 225 via expansion slots, the COMMUNITY field 302 may be used to specify the expansion slot number. Alternatively, the local addresses of the controller and service modules may be expressed as a range of I/O addresses. Data path 225 may also be implemented as another network that is not accessible by network manager 130. Depending on the length of local addresses, local address information may be expressed directly as the local address, or indirectly by encoded values. SNMP message forwarding circuit 209 would then include decode circuitry for deriving the correct local address from the encoded value supplied by the COMMUNITY field of the SNMP message.

Figure 4:
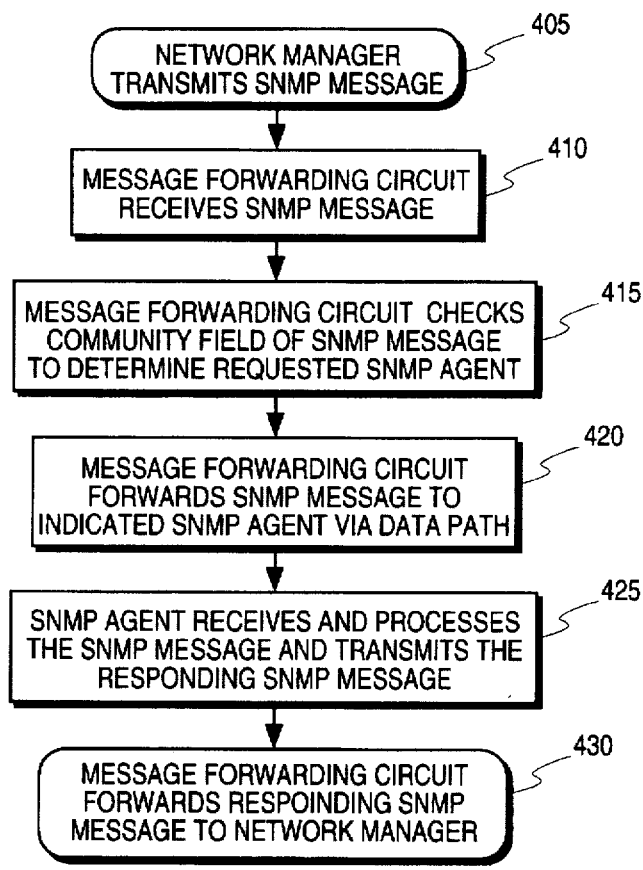
FIG. 4 is a flow chart of one method for determining a destination trunk or service module by the management message forwarding circuit.

FIG. 4 shows a method for forwarding SNMP management messages. At process clock 405, network manager 130 transmits a network message that specifies network switch 200 in its destination address field. The network message includes an SNMP message. Local address information that specifies the ultimate destination of the SNMP message is included in the COMMUNITY field of the SNMP message.

Message forwarding circuit 209 receives the SNMP message at process block 410, and checks the COMMUNITY field of the SNMP message to determine the local address information at process block 415. Message forwarding circuit 209 forwards the SNMP message to the destination indicated by the local address information. If the local address information specifies SNMP agent 206, message forwarding circuit 209 forwards the SNMP message to SNMP agent 206 via an internal data path. If the local address information specifies one of the SNMP agents 211, 216, or 221, message forwarding circuit 209 forwards the SNMP message to the indicated SNMP agent using data path 225.

At process block 425, the SNMP agent receives and processes the forwarded SNMP message and transmits a responding SNMP message to SNMP message forwarding circuit 209 using the data path from which the initial SNMP message was received from the message forwarding circuit 209. At process block 430, message forwarding circuit 430 forwards the responding SNMP message to network manager 130. According to the SNMP, certain types of SNMP messages may be initiated by SNMP agents, and such SNMP messages may similarly be sent to network manager 130 via SNMP message forwarding circuit 209.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than restrictive sense.

What is claimed is:

1. A network switch that operates according to a simple network management protocol (SNMP) comprising:

a data path;

at least one trunk module coupled to the data path;

at least one service module coupled to the data path; and a controller coupled to the data path, wherein each of the trunk module, the service module, and the controller are provided with individual network management agents operative to process SNMP messages.

2. A network node that operates according to a simple network management protocol (SNMP) comprising:

a data path; and a plurality of modules coupled to the data path, wherein each module is provided with an individual network management agent operative to process SNMP messages.

3. A network that operates according to a simple network management protocol (SNMP), the network comprising:

a network manager;

a plurality of network nodes coupled to the network manager wherein the network manager controls configuration of the network nodes by transmitting SNMP messages to network addresses of the network nodes, the plurality of network nodes including a first network node that comprises:

a data path; and a plurality of modules coupled to the data path, wherein each module is provided with an individual network management agent operative to process SNMP messages.

4. A communication switching apparatus, comprising:

a plurality of access modules each adapted to couple said switching apparatus to one or more associated communication links, each of said access modules including an associated network management agent adapted to receive management messages and to configure said associated access modules according to control information contained within said management messages; and a message forwarding circuit coupled to each of said access modules via a data path and adapted to couple said switching apparatus to a network controller, said message forwarding circuit configured to receive said management messages from said network controller and to forward said management messages to said access modules over said data path according to local addresses contained within said management messages, each of said local addresses corresponding to an associated one of said access modules.

5. A communication switching apparatus as in claim 4 wherein said management messages are formatted to include a community field which includes said local addresses and a protocol data unit field which includes said control information, said control information corresponding to a simple network management protocol (SNMP).

6. A communication switching apparatus as in claim 4 wherein said management messages are formatted to include a wrapper field which includes said local addresses and a protocol data unit field which includes said control information, said control information corresponding to a simple network management protocol version 2 (SNMPv2).

7. A communication switching apparatus as in claim 4 further comprising a local controller coupled to said data path and to said message forwarding circuit, said local controller including a management agent configured to receive management messages having a local address corresponding to said local controller from said message forwarding circuit.

8. A communication network, comprising:

a network manager; and a plurality of communication switches coupled together by a plurality of communication links, at least one of said communication switches coupled to said network manager and including one or more access modules each adapted to couple said one switch to one or more of said communication links and a message forwarding circuit coupled to each of said access modules via a data path and adapted to receive management messages from said network manager and to forward said management messages to said access modules over said data path according to local address information contained within each management message, said access modules each including an associated network management agent adapted to receive said management messages and to configure said associated access modules according to control information contained within said management messages.

9. A communication network as in claim 8 wherein said network operates according to a simple network management protocol (SNMP) and said management messages include a community field formatted to include said local address information and a protocol data unit field formatted to include said control information according to said SNMP.

10. A communication network as in claim 8 wherein said network operates according to a simple network management protocol version 2 (SNMPv2) and said management messages include a wrapper field formatted to include said local address information and a protocol data unit field formatted to include said control information according to said SNMPv2.

11. A method of managing a communication switching apparatus, comprising the steps of:

transmitting a management message from a network manager to said communication switching apparatus, said management message including local address information and control information;

receiving said management message at a message forwarding circuit of said communication switching apparatus and transferring said management message to one of a plurality of access modules of said communication switching apparatus across a data path according to said local address information;

receiving said management message at a network management agent of said one access module and configuring said access module according to said control information.

12. A method of managing a communication switching apparatus as in claim 11 wherein said management message includes a community field formatted to include said local address information and a protocol data unit formatted to include said control information according to a simple network management protocol (SNMP).

13. A method of managing a communication switching apparatus as in claim 11 wherein said management message includes a wrapper field formatted to include said local address information and a protocol data unit formatted to include said control information according to a simple network management protocol version 2 (SNMPv2).

\* \* \* \* \*